H. H. FLECKENSTEIN.
ADJUSTABLE SAND SHIELD FOR VEHICLES.
APPLICATION FILED OCT. 15, 1914.
1,165,584.
Patented Dec. 28, 1915.
2 SHEETS—SHEET 1.
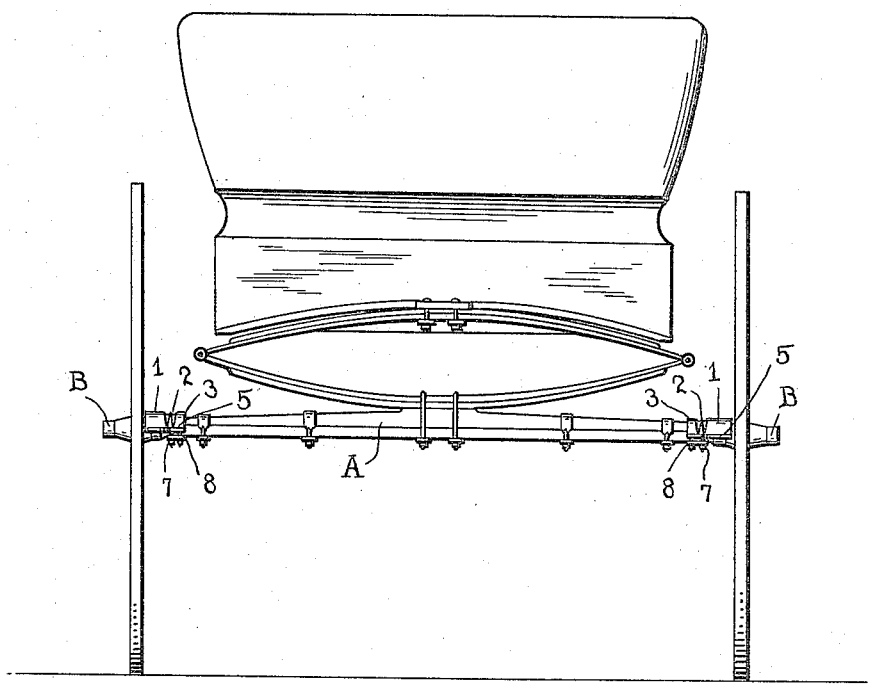
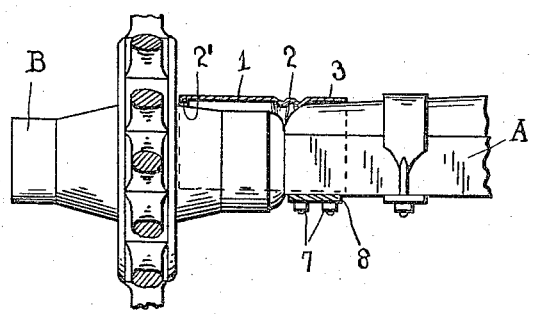
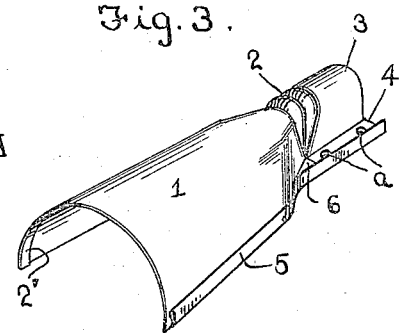
Witnesses
L. B. James
D. Lusby
Inventor
H. H. Fleckenstein
By Geo. W. Sues
Attorney H. H. FLECKENSTEIN.
ADJUSTABLE SAND SHIELD FOR VEHICLES.
APPLICATION FILED OCT. 15, 1914.
1,165,584.
Patented Dec. 28, 1915.
2 SHEETS—SHEET 2.
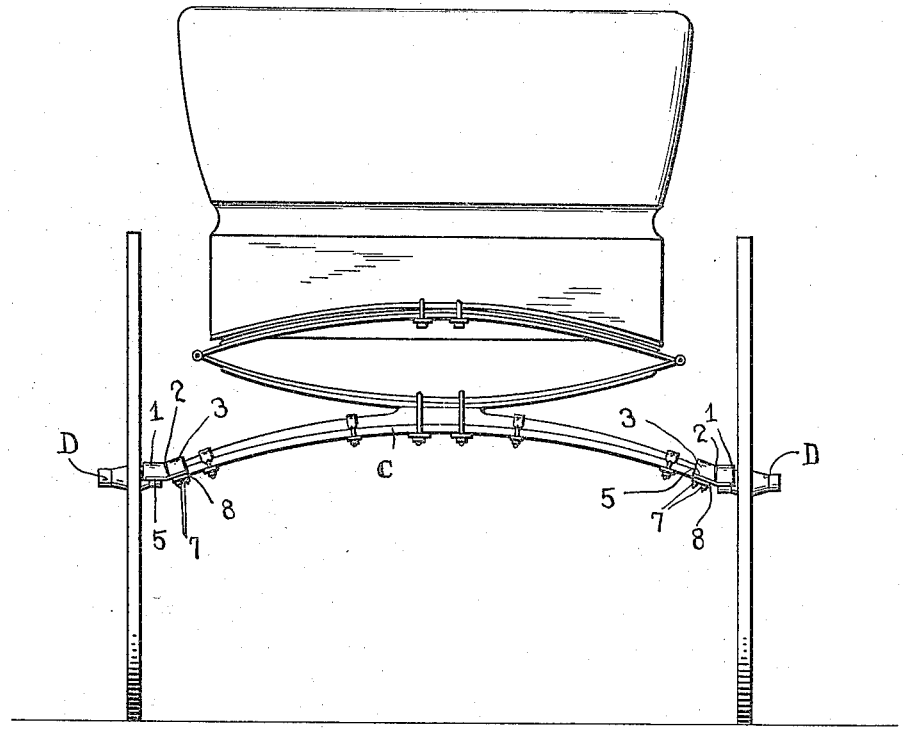
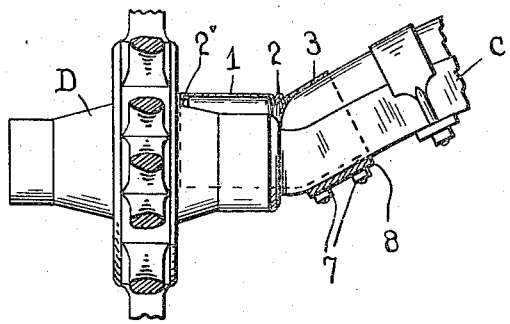
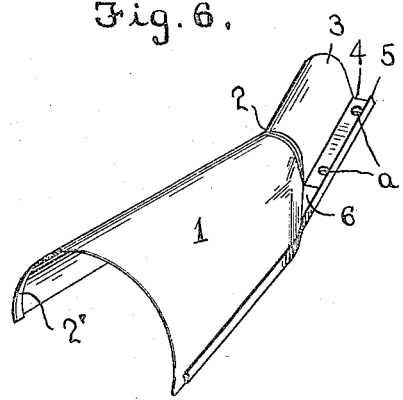
Witnesses
Geo. B. James.
D. Lusby
Inventor
H. H. Fleckenstein
By Geo. W. Suey.
Attorney

UNITED STATES PATENT OFFICE.

HUGO H. FLECKENSTEIN, OF SHOBONIER, ILLINOIS.

ADJUSTABLE SAND-SHIELD FOR VEHICLES.

1,165,584. Specification of Letters Patent. Patented Dec. 28, 1915.

Application filed October 15, 1914. Serial No. 866,830.

*To all whom it may concern:*

Be it known that I, HUGO H. FLECKENSTEIN, a citizen of the United States, and a resident of Shobonier, in the county of Fayette and State of Illinois, have invented certain new and useful Improvements in Adjustable Sand-Shields for Vehicles.

This invention has relation to certain new and useful improvements in shields employed in connection with vehicles; and the object of my invention is to provide a sand shield of a simple and inexpensive nature, and of a compact and durable construction, which shall be capable of convenient adjustment in position upon a vehicle axle to protect the axle and hub against sand, dust and dirt.

Another object is to provide an adjustable sand shield which is capable of being attached to a straight or an arched vehicle axle to protect the hub and axle bearings.

With these and other objects in view, the present invention consists in the combination and arrangement of parts as will be hereinafter more fully described and finally pointed out in the appended claim, it being further understood that changes in the specific structure shown and described may be made within the scope of the claim without departing from the spirit of the invention.

In the accompanying drawings forming a part of this specification and in which like numerals of reference indicate similar parts in the several views: Figure 1, is a rear view of a pleasure vehicle having a straight axle to which sand shields embodying my invention are attached. Fig. 2, is an enlarged broken detached detail of a straight axle and connected hub showing the shield in section. Fig. 3, is a perspective view of the shield showing the same as adjusted to fit a straight axle. Fig. 4, shows a pleasure vehicle with an arched axle showing my sand shields in working position. Fig. 5, is a sectional detail of an arched axle and hub showing the sand shield embodying my invention, as connected thereto. Fig. 6, shows a perspective view of the sand shield in which the cuff is bent upward to fit an arched axle.

In my present invention I provide a shield arranged to be attached to a vehicle axle to partly project over the hub and protect the same against dust, and dirt. As my invention is especially adapted to be used in connection with pleasure vehicles, I have shown the same as attached to a straight and arched buggy axle.

In the drawings the letter A, designates a straight axle, and B, a hub attached to the axle.

A shield embodying my invention comprises a sheet metal hood 1, which is tapering and pliable and is semi-circular in cross-section. As shown in the drawings the tapering hood ends in a corrugated flexible neck 2, terminating in a securing cuff 3.

Extending laterally from the cuff 3, and collar 2, are the two oppositely positioned apertured flanges 4, these flanges having the bolt openings *a*, a flange 5, extending from the apertured flange 4, and being lapped against the edges of the hood 1, as shown in Figs. 3 and 6. The outer or enlarged end of the hood 1, is strengthened by the edge flange 2', which serves to stiffen the hood at the outer end.

Arranged to be held within the apertures 2, are the bolts 7, which pass through a securing plate 8, to hold the cuff to the vehicle axle, in such a manner that the hood will ride over the wheel hub in the manner shown in Figs. 2 and 5.

As the hood 1, can be flexed the same can be bent to snugly encompass the hub while the corrugated flexible neck 3, permits the cuff being bent at any desired angle to the axis of the hood, so that the sand shield can be secured to a straight or arched axle.

At the union of the corrugated neck 2, and hood end, I provide the triangular blocks 6, which strengthen the neck at its base and also add rigidity to the securing flanges 4.

These shields can be colored to harmonize with the painting of the vehicle, and being ornamental in no way detract from the sightly appearance of the vehicles. The shields are further made in different sizes, and are simple and inexpensive in construction, and both durable and efficient in operation, and can be secured to any conventionally constructed vehicle axle with ease, accuracy and despatch.

Having thus described my said invention, what I claim as new and desire to secure by Letters Patent is:

The combination with a vehicle axle and a hub, of a sand shield comprising a tapering pliable semi-circular sheet metal hood adapted to ride over said hub ending in a corrugated flexible neck terminating in a securing cuff held upon said axle having outstanding apertured flanges, bolts within said apertures, and a securing plate carried by said bolts to hold said neck to said axle.

In testimony whereof I affix my signature in the presence of two witnesses.

HUGO H. FLECKENSTEIN.

Witnesses:
Jos. C. Burtschi,
J. W. Schenker.

Copies of this patent may be obtained for five cents each, by addressing the "Commissioner of Patents, Washington, D. C."